US00RE49320E

(19) United States
(12) Reissued Patent
Chen et al.

(10) Patent Number: US RE49,320 E
(45) Date of Reissued Patent: Nov. 29, 2022

(54) LIGHTING DEVICE WITH BUILT-IN RF ANTENNA

(71) Applicant: SIGNIFY HOLDING B.V., Eindhoven (NL)

(72) Inventors: Bingzhou Chen, Shanghai (CN); Guoping Zhang, Shanghai (CN); Martijn Henri Richard Lankhorst, Eindhoven (NL); Roger Henri Denker, Eindhoven (NL); Jeroen Snelten, Liempde (NL); Dennis Johannes Antoniius Claessens, Eindhoven (NL); Ludo Haenen, Sint Oedenrode (NL); Jacobus Hubertus Anna Selen, Eindhoven (NL); Patrick Van Kooten, Hurstville Grove (AU)

(73) Assignee: SIGNIFY HOLDING B.V., Eindhoven (NL)

(21) Appl. No.: 17/371,423

(22) Filed: Jul. 9, 2021

Related U.S. Patent Documents

Reissue of:
(64) Patent No.: 9,184,497
Issued: Nov. 10, 2015
Appl. No.: 13/376,294
PCT Filed: Jun. 4, 2010
PCT No.: PCT/IB2010/052491
§ 371 (c)(1),
(2) Date: Jul. 17, 2012
PCT Pub. No.: WO2010/140136
PCT Pub. Date: Dec. 9, 2010

(30) Foreign Application Priority Data

Jun. 5, 2009 (CN) ..... 200910139298.3

(51) Int. Cl.
*H01Q 1/26* (2006.01)
*H01Q 1/38* (2006.01)
(Continued)

(52) U.S. Cl.
CPC ..... *H01Q 1/44* (2013.01); *F21V 23/045* (2013.01); *F21V 23/0435* (2013.01); *H01Q 1/38* (2013.01);
(Continued)

(58) Field of Classification Search
CPC .. H01Q 1/26; H01Q 1/38; H01Q 1/44; H01Q 1/52; H01Q 3/36; H01Q 9/42;
(Continued)

(56) References Cited

U.S. PATENT DOCUMENTS 6,160,512 A 12/2000 Desclos et al.
6,356,700 B1 * 3/2002 Strobl ..... G03B 21/204 362/346
(Continued)

FOREIGN PATENT DOCUMENTS

CN 1849707 A 10/2006
CN 2835802 Y 11/2006
(Continued)

*Primary Examiner* — My Trang Ton

(57) ABSTRACT

A lighting device, such as a replacement lighting device, comprising a light source (LS), e.g. LEDs, for producing light along an optical axis (OA). A heat sink (HS) made of a material with an electrical resistivity being less than 0.01 Ωm, e.g. a metallic heat sink being a part of the housing, transports heat away from the light source (LS). A Radio Frequency (RF) communication circuit (CC) connected to an antenna (A) serves to enable RF signal communication, e.g. to control the device via a remote control. Metallic components, including the heat sink (HS), having an extension larger than 1/10 of a wavelength of the RF signal are arranged below a virtual plane (VP) drawn orthogonal to the optical axis (OA) and going through the antenna (A). Hereby a compact device can be obtained, and still a satisfying RF radiation pattern can be obtained. The antenna can be a wire antenna or a PCB antenna, e.g. a PIFA or a IFA type antenna. In a special embodiment the antenna is formed on a ring-
(Continued)

shaped PCB with a central hole allowing passage of light from the light source. Preferably, the antenna is positioned at least 2 mm in front of the heat sink (HS).

25 Claims, 6 Drawing Sheets

(51) Int. Cl.

| | |
|---|---|
| ***H01Q 1/44*** | (2006.01) |
| ***H01Q 1/52*** | (2006.01) |
| ***H01Q 3/36*** | (2006.01) |
| ***H01Q 9/42*** | (2006.01) |
| ***H05B 33/08*** | (2020.01) |
| ***F21V 23/04*** | (2006.01) |
| ***F21K 99/00*** | (2016.01) |
| ***F21V 3/00*** | (2015.01) |
| ***F21V 29/85*** | (2015.01) |
| ***H05B 45/00*** | (2022.01) |
| ***H05B 47/19*** | (2020.01) |
| ***H05B 45/10*** | (2020.01) |
| ***H05B 45/357*** | (2020.01) |
| *F21K 9/233* | (2016.01) |
| *F21Y 113/13* | (2016.01) |
| *F21K 9/232* | (2016.01) |
| *F21Y 115/10* | (2016.01) |

(52) U.S. Cl.
CPC ..... *H01Q 1/52* (2013.01); *H01Q 3/36* (2013.01); *H01Q 9/42* (2013.01); *H05B 45/00* (2020.01); *H05B 45/10* (2020.01); *H05B 45/357* (2020.01); *H05B 47/19* (2020.01); *F21K 9/232* (2016.08); *F21K 9/233* (2016.08); *F21V 3/00* (2013.01); *F21V 29/85* (2015.01); *F21Y 2113/13* (2016.08); *F21Y 2115/10* (2016.08)

(58) Field of Classification Search
CPC ..... H05B 33/08; H05B 33/0845; H05B 33/0803; H05B 37/02; H05B 37/0272; F21V 3/00; F21V 23/04; F21V 23/045; F21V 23/0435; F21V 29/85; F21Y 101/02; F21Y 113/00; F21Y 2101/02; F21Y 2113/005; F21K 99/00; F21K 9/135; F21K 9/137
USPC ..... 315/32, 34, 46, 49, 50, 149–151, 315/156–158
See application file for complete search history.

(56) References Cited

U.S. PATENT DOCUMENTS

| | | | | |
|---|---|---|---|---|
| 7,038,625 | B1 | 5/2006 | Taylor et al. | |
| 7,350,936 | B2 | 4/2008 | Ducharme et al. | |
| 7,521,872 | B2 * | 4/2009 | Bruning | 315/158 |
| 7,741,782 | B2 * | 6/2010 | Vermeulen et al. | 315/34 |
| 2002/0122005 | A1 | 9/2002 | Lebaric et al. | |
| 2004/0056802 | A1 | 3/2004 | Hollister | |
| 2004/0232849 | A1 | 11/2004 | Roach | |
| 2006/0017618 | A1 | 1/2006 | Tseng et al. | |
| 2007/0007898 | A1 * | 1/2007 | Bruning | 315/34 |
| 2007/0080810 | A1 | 4/2007 | Juds | |
| 2007/0252528 | A1 * | 11/2007 | Vermuelen et al. | 315/34 |
| 2008/0211369 | A1 | 9/2008 | Zhang et al. | |

FOREIGN PATENT DOCUMENTS

| | | | |
|---|---|---|---|
| CN | 1945985 | A | 4/2007 |
| CN | 100416828 | C | 9/2008 |
| CN | 203057588 | U | 7/2013 |
| DE | 19940651 | A1 | 3/2001 |
| EP | 1501154 | A1 | 1/2005 |
| JP | 2008204922 | A | 9/2008 |
| JP | 2009026213 | A | 2/2009 |
| JP | 2010541152 | A | 12/2010 |
| WO | 2005024898 | A2 | 3/2005 |
| WO | 2006006135 | A1 | 1/2006 |
| WO | 2009040703 | A2 | 4/2009 |

* cited by examiner

LIGHTING DEVICE WITH BUILT-IN RF ANTENNA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue of U.S. patent application Ser. No. 13/376,294 (Issued U.S. Pat. No. 9,184,497).*

FIELD OF THE INVENTION

The present invention relates to the field of lighting devices. More specifically, the invention provides a lighting device, e.g. in the form of a standard power socket lamp, with a built-in Radio Frequency (RF) antenna. The invention provides a lighting device with an antenna suited for reliable communication of RF signals in a wide directivity pattern.

BACKGROUND OF THE INVENTION

Intelligent lighting has become widespread, and RF communication is a powerful technology to be used in the tele management of lamps, in particular for domestic and office environments. Instead of controlling the power, e.g. 230 V supply, to the lamp, the trend has moved towards directly controlling the light source or lighting device, i.e. the exchangeable element of the lamp, by sending an RF control signal to the lighting device. For indoor use the ISM band covers suitable frequencies to allow communication over a range of up to 20 meter. A suitable communication standard for low data-rate applications such as tele management of lamps is ZigBee. The transmitted control signals can be used to remotely control the state (ON/OFF), light-output (color, Luminous Flux), beam-width or orientation of the lamp. To effectively transmit or receive such tele management control signals, each lamp has to be provided with an antenna.

The performance of the antenna in a lamp must not be disturbed by other lamp components made from electrically conductive materials (or non-conductive materials that may lower the Q factor or resonance frequency) that could shield the RF signal in certain directions or change resonance frequency of the antenna, and thus significantly influence the RF communication with remote controls or other lamps. Thus, it is import that the antenna that radiates with significant directive gain in a large solid angle. For reliable communication with other lamps and with remote controls, the solid angle corresponding to all directions with sufficient gain (e.g. more than −10 dB with reference to an loss-less isotropic antenna) should practically be in the range between $2\pi$ and $3\pi$. This is a problem to obtain within the limited dimensions of the outer enclosure of such device, since such dimensions are often dictated by standard size housings and power sockets.

US 2007/0252528 describes a lighting fixture or luminaire, such as used in street-lighting, incorporating an RF antenna. However, the RF antenna is placed outside the lighting device forming the light source, rather the RF antenna is placed in a portion of the external housing which is made of a non-shielding material that does not disturb RF waves in reaching the antenna.

SUMMARY OF THE INVENTION

Hence, according to the above description, it is an object to provide a lighting device, such as a miniature replacement lamp, which still allows a wide spatial range of wireless RF communication with the lighting device in spite of a size that is so small that a very effective heat sink is needed to remove the unavoidable heat dissipation in the light source.

In a first aspect, the invention provides lighting device, such as a replacement lighting device, comprising a light source arranged to generate light along an optical axis, a heat sink made of a material with an electrical resistivity being less than 0.01 Ωm, e.g. a metallic heat sink, arranged for removing heat produced by the light source, a Radio Frequency communication circuit, and an antenna connected to the Radio Frequency communication circuit and arranged for communicating Radio Frequency signals, such as Radio Frequency control signals arranged within an outer enclosure, such as an outer enclosure partly formed by the heat sink, wherein metallic components of the lighting device having an extension larger than 1/10 of a wavelength of the Radio Frequency signals are arranged below a virtual plane drawn orthogonal to the optical axis and going through the antenna.

A lighting device according to the first aspect can be designed with very compact dimension, e.g. with a Light Emitting Diode (LED) based light source, since the heat sink provides an effective transport of heat away from the light source. Thus, the lighting device is suited for low energy replacement lamps which can be directly remote controlled, e.g. with respect to such as on/off, intensity, color, beam width, and light orientation. Arranging the antenna in relation to metallic components larger than 1/10 of a wavelength of the communication Radio Frequency (RF) signal such as defined, RF communication and thus RF control of the lighting device is possible within a wide partial range of angles, since RF disturbing components of metal are placed away from the antenna.

Having a heat sink with an electrical resistivity of less than 0.01 Ωm serves to provide a heat sink with a substantial thermal conductivity, thus allowing the lighting device to be miniature sized. Especially, the heat sink may be made of a material with electrical resistivity of less than 0.001 Ωm, such as les than 0.0001 Ωm, such as less than 0.00001 Ωm. The heat sink can be made of a material including a substantial amount of metal, and especially the heat sink may be a metallic heat sink in the form of a solid metal body, e.g. an aluminum body. Alternatively, the heat sink may be made by a polymeric material with a conductive filling material serving to provide the mentioned electrical resistivity. E.g. the filling material can be a metal, such as copper or steel. Alternatively, the filling material is carbon or graphite. A filling degree of 5-20%, such as approximately 10% can be used.

Metallic components of the lighting device having an extension larger than 1/10 of a wavelength of the Radio Frequency signals may be arranged at least 4 mm below the virtual plane drawn orthogonal to the optical axis and going through the antenna. Hereby, a very wide RF communication angle can be obtained. Especially, the antenna may be arranged at least 2 mm in front of the heat sink, such as 4 mm in front of the heat sink, thus allowing a wide RF communication angle while enabling the heat sink to be large enough to ensure effective cooling. Metallic components of the lighting device having an extension larger than 1/15 of a wavelength, such as larger than 1/20, of the Radio Frequency signals are preferably arranged below a virtual plane drawn orthogonal to the optical axis and going through the antenna. Very small metal objects, i.e. small compared to the RF signal wavelength, can be tolerated, e.g. in the form of parts of electronic chips and solder material and the like, while especially the heat sink and such large metallic components significantly destroys RF communication to/from the antenna. Especially, the heat sink may form part of the outer enclosure, such as a significant part of the outer enclosure.

In one embodiment, a radiating part of the antenna substantially extends in one single plane, such one single plane being substantially perpendicular to the optical axis, However, in some embodiment, the radiating parts of the antenna have a considerable extension in the direction of the optical axis.

The antenna may be a wire antenna, such as one of: a ¼ wavelength IFA antenna, a Yagi antenna, and a loop antenna.

Alternatively, or additionally, the antenna is disposed on a first Printed Circuit Board (PCB), such as disposed on an end part of the PCB. Hereby, a very compact antenna can be provided, since a PCB will normally be present in the lighting device to hold the necessary electronic circuits for controlling the light source. Especially, the antenna may be disposed on an end part of the first PCB, wherein this end part is arranged for position in an opening of a second PCB, preferably such that the first and second PCBs re substantially perpendicular to each other, and preferably arranged such that the second PCB is substantially perpendicular to the optical axis. The RF communication circuit may be disposed on the first PCB, preferably comprising a matching circuit connected between the antenna and the RF communication circuit. Hereby, a very compact design can be provided, since the first PCB is utilized for a plurality of purposes, and a short distance between the RF circuit and the antenna can be provided, and still further, such PCB is suited for automated manufacturing due to the absence of wiring between antenna and RF circuit. Especially, the RF communication circuit may be disposed on one side of the first PCB, while the antenna is disposed on an opposite side of the first PCB.

The first PCB may have an opening, such as an opening through its centre, and be positioned in relation to the light source such that light can pass from the light source out of the enclosure through the opening in the first PCB. The PCB may be substantially ring shaped, and wherein first and second antennas are disposed on different part on one side of the first PCB.

In case of a PCB antenna, the antenna may be one of: an IFA antenna, a PIFA antenna, a Yagi antenna, and a loop antenna (closed). In the latter case a balun circuit is not needed, just a balanced output is required.

The lighting device may comprise a second antenna, wherein the first and second antennas are oriented so as to radiate RF signals in different directions, such as the first and second antennas being different types of antennas. Hereby an improved compatibility and improved spatial communication range is possible. Especially, the first and second antennas are connected so as to provide antenna diversity.

In some embodiment, the lighting device comprises a control circuit arranged to control a function of the lighting device, such as a function of the light source or an optical element, in accordance with data received in an RF signal received via the RF antenna and the RF communication circuit. Especially, the function may be one or more of: on/off, intensity, color, beam width, and light orientation.

In some embodiments, the lighting device comprises a standard shaped power socket for receiving electric power to power the light source, such as a power socket being one of: E27, E14, E40, B22, GU-10, GZ10, G4, GY6.35, G8.5, BA15d, B15, G53, and GU5.3. Thus, in such embodiments, the lighting device can be a low energy replacement lamp for replacement of halogen spots or incandescent lamps.

The light source may comprise at least one of: a C F (compact fluorescent) light source, a Luminescent EMI light source, and a Light Emitting Diode, such as an OLED or a PolyLED or a set of Light Emitting Diodes of different colors.

US

The outer enclosure preferably comprises a transparent or translucent part arranged allowing light from the light source to penetrate.

In a second aspect, the invention provides a lamp, e.g. replacement lamp, comprising, a lighting device according to the first aspect.

In a third aspect, the invention provides a system comprising a lighting device according to the first aspect, and a remote control arranged for wireless Radio Frequency control of at least one parameter of the lighting device.

In a fourth aspect, the invention provides a method for arranging a Radio Frequency communication antenna within an outer enclosure of a lighting device, such as a replacement lighting device, comprising a light source defining an optical axis, the method comprising arranging the antenna such within the outer enclosure, that metallic components of the lighting device having an extension larger than 1/10 of a wavelength of the Radio Frequency signals are arranged below a virtual plane drawn orthogonal to the optical axis and going through the antenna, such that the antenna radiation pattern is not affected significantly.

It is appreciated that the same advantages and the same embodiments as mentioned for the first aspect apply as well for the second, third, and fourth aspects.

BRIEF DESCRIPTION OF THE FIGURES

The present invention will now be explained, by way of example only, with reference to the accompanying Figures, in which.

DETAILED DESCRIPTION OF EMBODIMENTS

Figure 1:
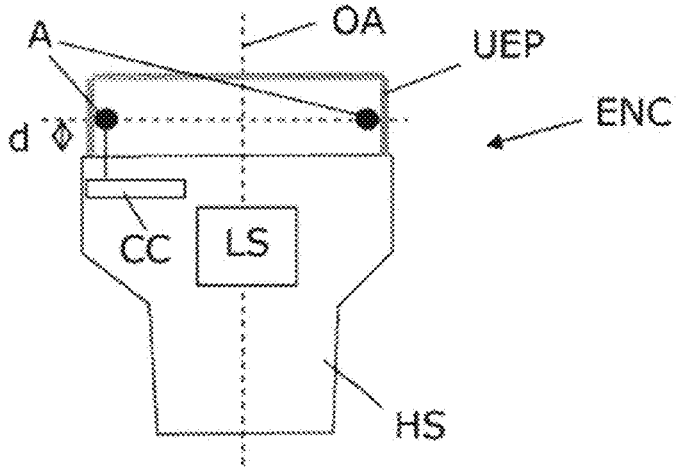
FIGS. 1-5 illustrate sketches of different lighting device embodiments.

FIG. 1 illustrates a simple sketch of a section through a lighting device embodiment with an outer enclosure ENC in the form of an upper and a lower part, wherein the lower part is a metal housing HS and the upper part UEP is a non-metallic material, e.g. a polymeric material. The metal housing HS serves as heat sink to transport heat away from the light source LS positioned within the enclosure ENC. The light source LS generates light along an optical axis OA, and the light escapes the outer enclosure ENC through a transparent or translucent part of the upper enclosure part UEP. An RF antenna A in the form of a wire antenna is indicated with black color, and the antenna A is connected to an RF communication circuit CC placed within the outer enclosure ENC. As seen, the antenna A is positioned in the upper enclosure part UEP, i.e. above the metal housing HS.

The antenna is placed with a distanced between the metal housing HS and a plane through a plane extended by the antenna A, a plane perpendicular to the optical axis OA. Preferably, the antenna A and RF communication circuit CC can receive a wireless RF control signal from a remote control, e.g. in the frequency range 1-3 GHz, such as around 2.4 GHz. Hereby the lighting device can receive data which can be used to control various parameters related to the light generated by the device, e.g. switch on/off the light source LS. It is appreciated that other frequency ranges may be used, e.g. a band in the 60 GHz range, e.g. combined with the antenna A being a Yagi antenna or an array phased antenna. Antenna diversity is also possible.

Figure 2:
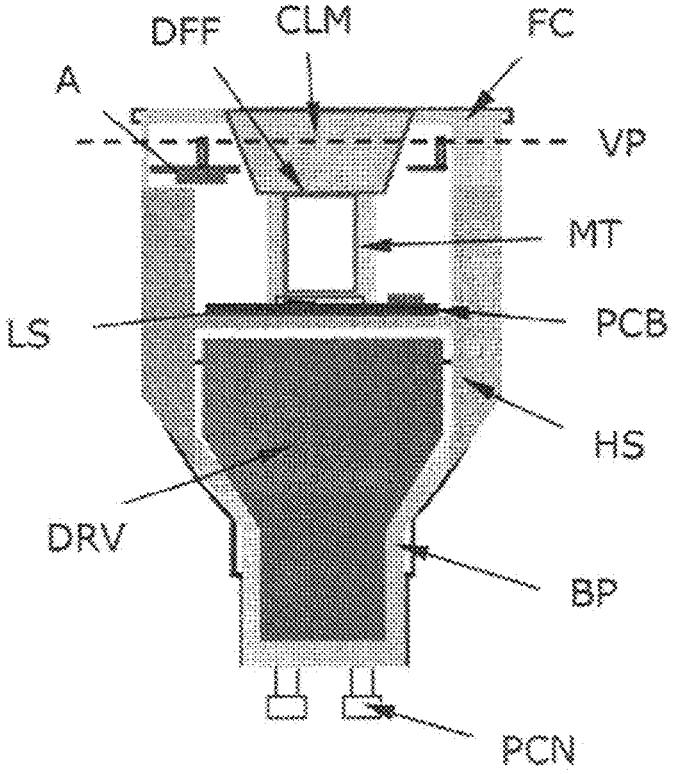

FIG. 2 illustrates a sketch of a section through retrofit spot lamp with a GU 10 standard power connector PCN. A benefit of this construction is also that the power electronics part DRV is shielded from the RF part by metal in between. If there is a coupling, the packet error rate will increase due to modulation of the power supply switching frequency on the transceiver circuit. The light source LS includes a set of LEDs, e.g. Red, Green, Blue, colored LEDs. The outer enclosure has a back part BP in the form of a plastics, where the power connector PCN penetrates the outer enclosure. A middle part of the outer enclosure is in form of a metal housing HS with a rib outer structure and connected to the heat sink so as to effectively transport heat from the light source LS. E.g. the metal housing HS is formed by aluminium. The upper part of the outer enclosure is in the form of a plastic front cap FC.

Inside the outer enclosure, a driver circuit DRV is positioned. The driver circuit preferably includes a mains voltage power converter, a driver for the LED light source LS and an additional supply for the control chip. The LEDs LS are positioned on a Printed Circuit Board PCB which also holds control circuit components. A hollow hexagonal mixing tube MT with a reflective and electrically conductive material at its inner surface serves to guide light from the light source LS to a plastic collimator CLM. A diffuser DFF is inbetween the collimator and the mixing tube for additional colour nixing.

In the upper part of the device an RF antenna A is positioned. The antenna A is disposed on a ring-shaped PCB which allows the collimator CLM and thus light from the light source LS to pass through the opening inside the ring-shape. In one version, the antenna A is in the form of an IFA antenna, and an RF transceiver chip, a microprocessor, and a matching circuit serving to match for minimal noise figure and maximum power transfer, e.g. 50Ω matching, are mounted on the same PCB as the antenna A. The dashed line VP indicates a virtual plane through the antenna A. As seen, major metal objects which are disturbing to wireless RF signals reaching or leaving the antenna A, such as the metal housing HS, is located below the virtual plane VP through the antenna. Even small metal objects, e.g. solder material etc. in relation to the circuits mounted on the antenna PCB, are placed below the virtual plane VP through the antenna, since preferably such circuits are mounted on the lower side of the PCB, while the antenna elements are disposed on an upper side of the PCB.

Figure 3:
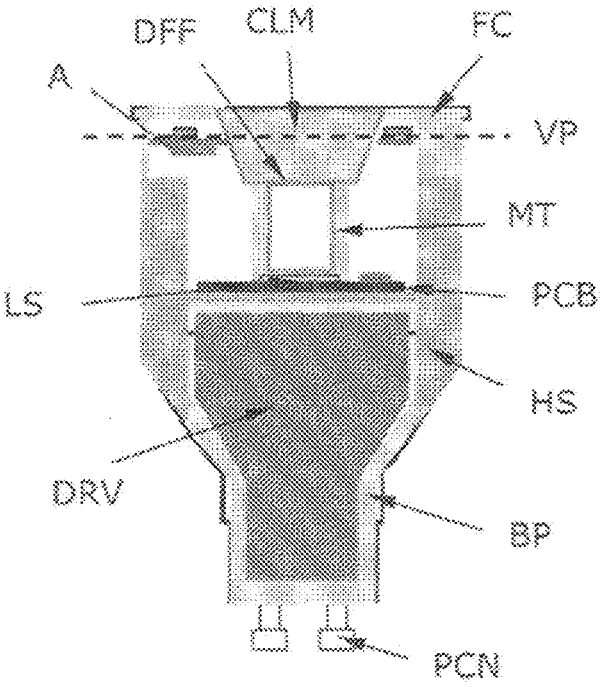

FIG. 3 illustrates a lighting device embodiment differing only from the one in FIG. 2 with respect to the antenna A. In FIG. 3, the illustrated antenna A is a PIFA antenna disposed on a ring-shaped PCB. All description relating to the antenna A from FIG. 2 holds as well for the antenna A of FIG. 3.

Figure 4:
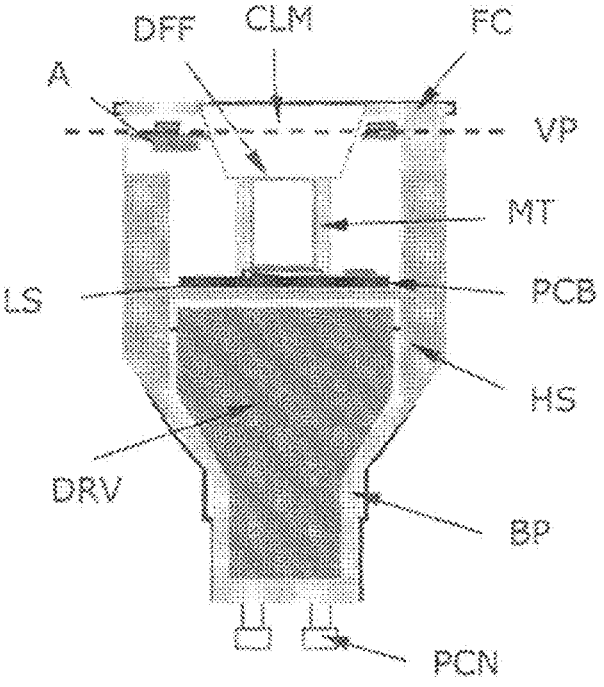

FIG. 4 illustrates yet another LED based retrofit spot lamp. This embodiment is similar to the one from FIG. 3 except that the collimator CLM is made of metal and has a transparent front cap. The collimator CLM thus forms a significant metal component since it has a significant size compared to typical RF signal wavelengths, and thus the collimator CLM will significantly influence the RF signal properties of the antenna A in case its metal parts are not placed below the virtual plane VP through the antenna A.

Figure 5:
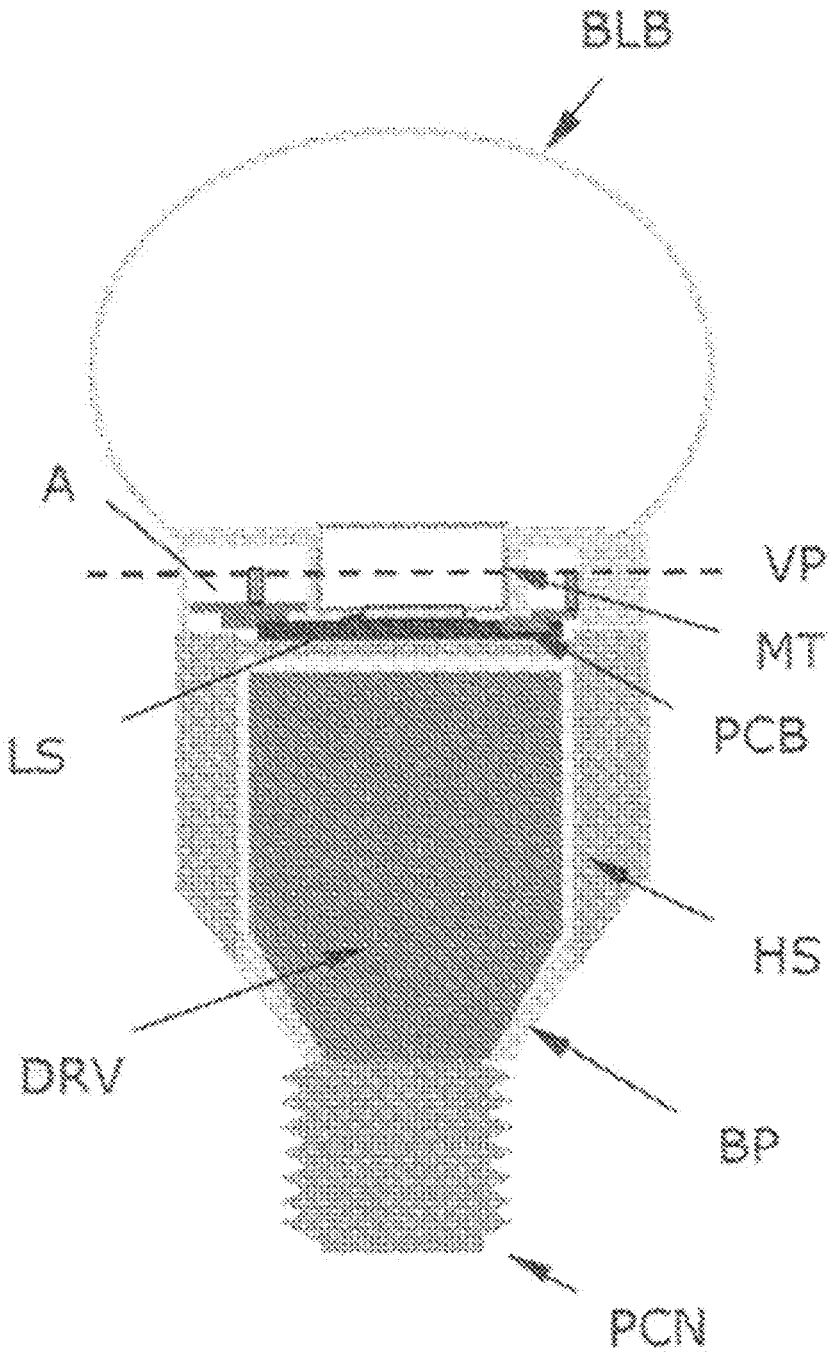

FIG. 5 illustrates a still further lighting device embodiment in the form of a retrofit LED based spot lamp. This embodiment has the same antenna A as the on in FIG. 2, i.e. an IFA antenna. A disposed on a ring-shaped PCB. However, it differs with respect to optical elements, since in this embodiment, a frosted bulb BLB forms the upper part of the outer enclosure of the lighting device. Further, the power connector PCN is in the form on E27 socket.

Figure 6:
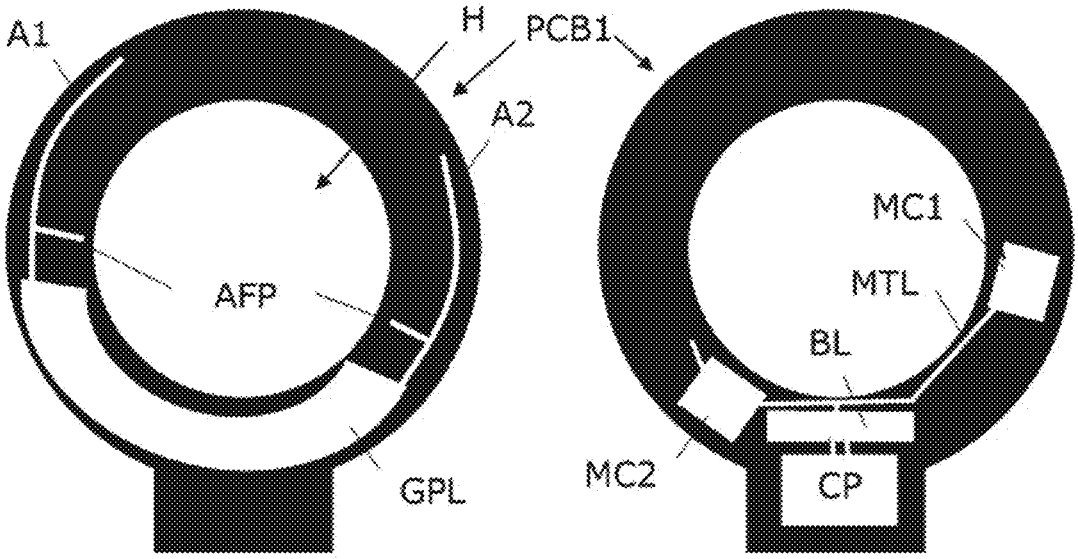
FIG. 6 illustrates an example of a dual antenna disposed on a ring PCB.

FIG. 6 illustrates the two opposite sides (to the left: top view, to the right: bottom view) of an example of a ring-shaped PCB1 with antenna elements in the form of electrically conducting paths disposed thereon, and a through-going circular hole H in the centre, i.e. the same type of antenna as described for FIGS. 2-5. In the embodiment of FIG. 6 two antennas A1, A2 are located at opposite parts but on the same side of the PCB1. The two antennas A1, A2 are both in the form of PIFA antennas each having a radiating element and a feed-point AFP, and they are electrically connected to one common ground plane GPL. To the right, on the opposite side of the PCB1, the antennas A1, A2 are connected via the feed-points AFP to respective matching circuits MC1, MC2. The first matching circuit MC1 is connected to a balun BL via a phase matching transmission line MTL providing an approximately 180° phase shift between the antenna A1, A2, while the matching circuits MC1, MC2 are identical. The balm BL is finally connected to a chip CP which is placed on an extension of the PCB1. E.g. this chip CP is a TI CC2430 chip including a transceiver and a microprocessor housed in one chip.

The two antennas A1, A2 provide a smaller sensitivity for interference between direct and reflected RF waves and for the polarization dependence of the antenna signal. An advantage of substantially ring-shaped PCB1 with an extension for the chip CP is that while light can penetrate in the centre hole H, cooling the light source by air convection is possible between the housing of the lighting device and outside the PCB1. Thus, it is preferred that the ring-shape of the PCB1 has a dimension smaller than an inner diameter of the housing so as to allow air convection for cooling.

Figure 7:
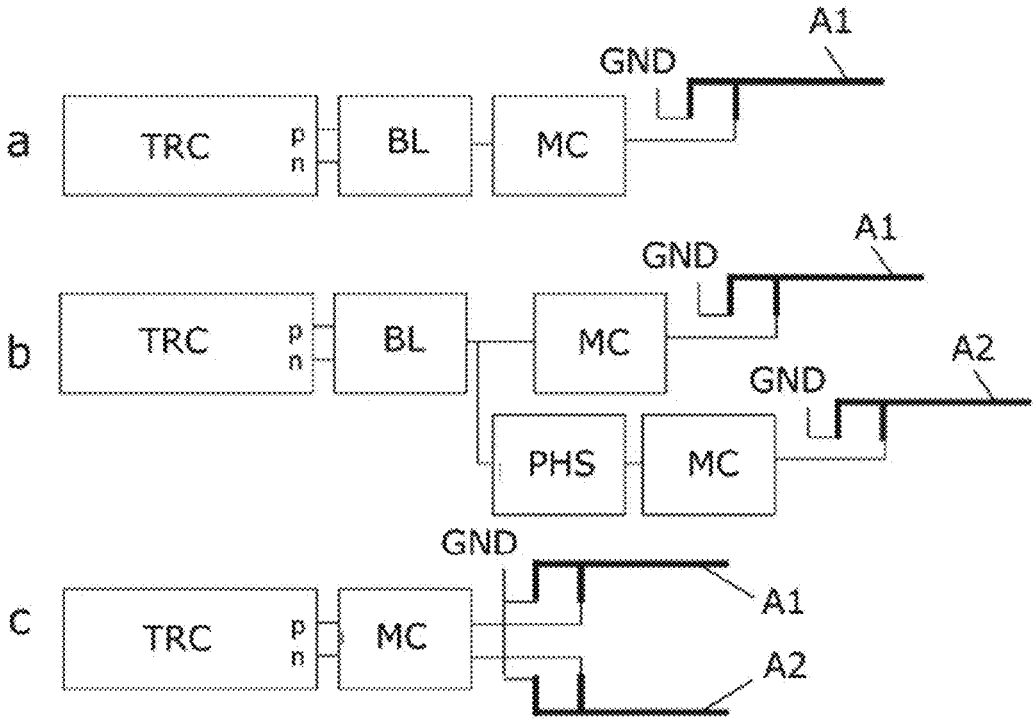
FIG. 7 illustrates three examples of connecting two antennas to a transceiver circuit.

FIG. 7 illustrates three diagrams a, b and c showing different ways of connecting either one antenna A1 or two antennas A1, A2 to a transceiver circuit TRC via a matching circuit MC. GND denotes electrical ground. In versions a and b a balun is interconnected between the matching circuit MC and the transceiver circuit TRC. Version b is the one illustrates for the ring-shaped dual antenna A1, A2 in FIG. 6. In version b the phase shift will influence the directional antenna sensitivity. When shifting the phase the natural dip in the (IFA) antenna sensitivity can be suppressed by phase shifting the antenna signals where the mechanical antenna orientation is e.g. 90°.

Figure 8:
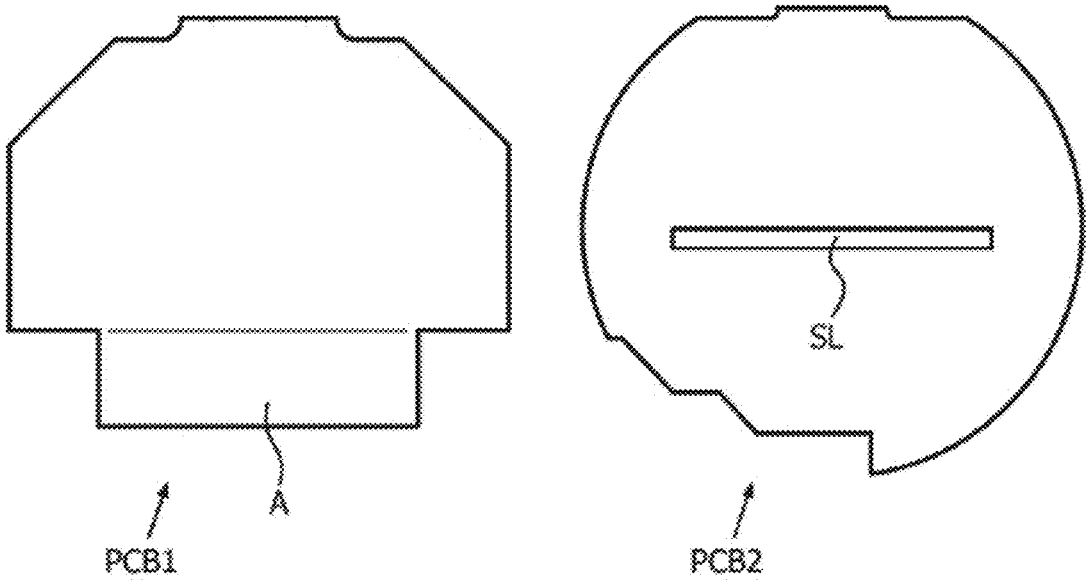
FIGS. 8-9, show photos of an example of a PCB antenna.
Figure 9:
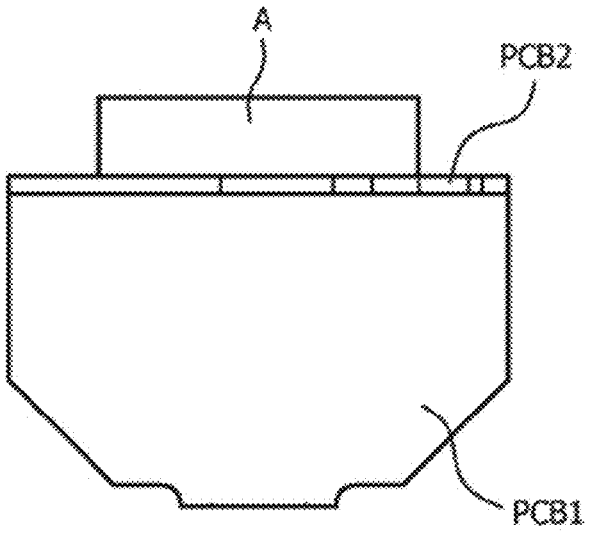

FIGS. 8 and 9 illustrate an antenna configuration suitable for Compact Flourescent (CFL) based light sources. The antenna in this case shown in FIG. 9 is very close to the electronics of the driver, and could be inside the fixture where the CFL light source is installed. FIG. 8 shows first and second PCBs PCB1, PCB2 next to each other, while FIG. 9 shows the two PCBs PCB1, PCB2 in an assembled state, namely with an end part of PCB1 inserted in a central slid or slot in PCB2. An antenna A is disposed on the end part of PCB1 piercing through PCB2. When installed in a lighting device, the antenna A preferably projects outwards and thus protruding in front of large metallic components. In this case the metal enclosure does not react as an absorber. PCB2 has a generally circular shape and is thus suited to fit a circular housing. PCB1 preferably comprises a transceiver chip connected to the antenna A. The central outward projecting antenna A is suited together with a light source in the form of a curved CFL tube. More PCBs with antennas may be mounted in more holes or slots in PCB2, in case a plurality of antennas are desired.

Figure 10:
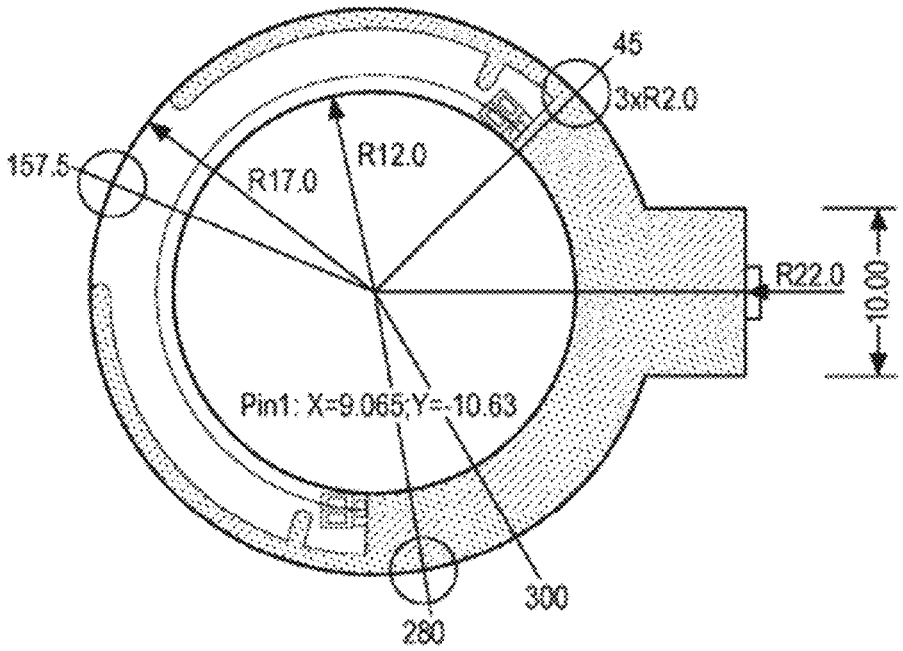
FIG. 10 shows a sketch of a specific ring-shaped PCB antenna.

FIG. 10 illustrates a specific ring-shaped PCB antenna with two antenna elements and a transceiver chip suited for Zigbee and WLAN communication. Dimensions indicated on the sketch are in mm. In a specific LED based lighting device embodiment the antenna is tuned to a frequency of 2.405 GHz.

Figure 11:
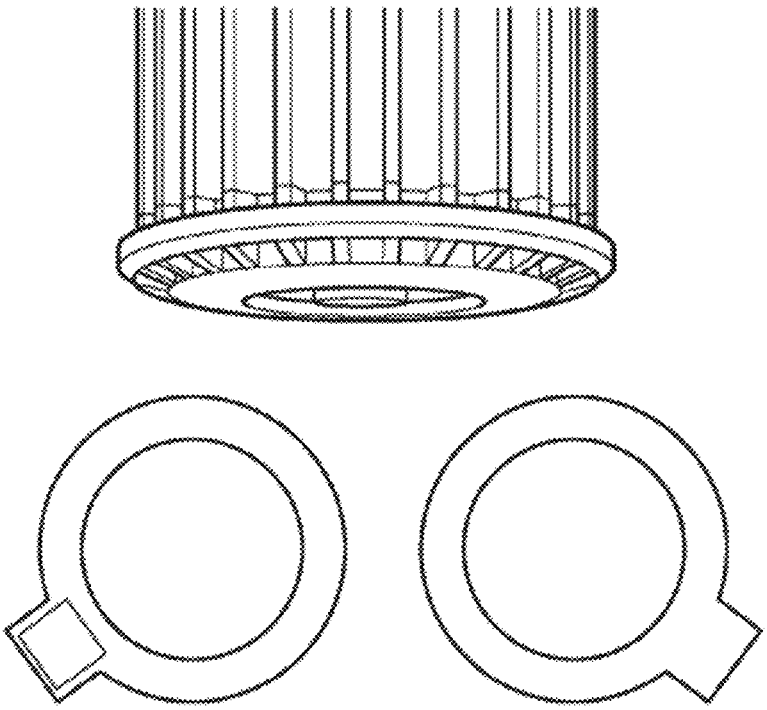
FIG. 11 shows a photo of a lighting device embodiment and the two ring-shaped PCBs contained therein.

FIG. 11 illustrates a lighting device with a ribbed alu housing serving as heat sink inside the housing an LED based light source is positioned. The two ring-shaped PCBs shown outside the device are fitted in the plastic front cap and connected together with a connecting socket providing a distance between the two PCBs. The upper one is the antenna PCB. The illustrated embodiment has been tested with respect to RF radiation pattern, and its directional performance was satisfying, e.g. >−10 dB antenna gain over large solid angle >27π. Furthermore, a return loss of less than 10 dB and an SWR of less than 2:1 over the whole ISM band (2400-2483.5 MHz) were measured.

To summarize, the invention provides a lighting device, such as a replacement lighting device, comprising a light source LS. e.g. LEDs, for producing light along an optical axis OA. A heat sink HS made of a material with an electrical resistivity being less than 0.01 Ωm, e.g. a metallic heat sink part of the housing, transports heat away from the light source LS. A Radio Frequency RF communication circuit CC connected to an an antenna (A) serves to enable RF signal communication, e.g. to control the device via a remote control. Metallic components, including the heat sink (HS), having an extension larger than 1/10 of a wavelength of the RF signal are arranged below a virtual plane (VP) drawn orthogonal to the optical axis (OA) and going through the antenna (A). Hereby a compact device can be obtained, and still a satisfying RF radiation pattern can he obtained. The antenna can be a wire antenna or a PCB antenna, e.g. a PIFA or a IFA type antenna. In a special embodiment the antenna is formed on a ring-shaped PCB with a central hole allowing passage of light from the light source. Preferably, the antenna is positioned at least 2 mm in front of the metallic heat sink (HS).

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A lighting device, comprising a light source comprising one or more light-emitting diodes configured for generating light along an optical axis, a heat sink comprising a metal with an electrical resistivity being less than 0.01 Ωm. and configured for removing heat produced by the light source, the heat sink forming at least a portion of an outer enclosure, a RF communication circuit, and a first antenna connected to the RF communication circuit for communicating RF control signals and arranged within the outer enclosure, wherein the lighting device comprises one or more metallic components having an extension larger than at least 1/10 of a wavelength of the RF control signals and arranged below a virtual plane drawn orthogonal to the optical axis and going through the first antenna.

2. [Lighting] *The lighting* device according to claim 1, wherein the metallic components are arranged at least 4 mm below the virtual plane drawn orthogonal to the optical axis and going through the *first* antenna.

3. [Lighting] *The lighting* device according to claim 1, wherein the *first* antenna is arranged at least 2 mm in front of the heat sink.

4. [Lighting] *The lighting* device according to claim 1, wherein the first antenna comprises a radiating part substantially extending in one single plane being substantially perpendicular to the optical axis.

5. [Lighting] *The lighting* device according to claim 1, wherein the first antenna is a wire antenna.

6. [Lighting] *The lighting* device according to claim 1, further comprising a first printed circuit board, wherein the first antenna is one of an IFA antenna, a PIFA antenna, a Yagi antenna, and a loop antenna and is disposed on the first printed circuit board.

7. [Lighting] *The lighting* device according to claim 6, further comprising a second printed circuit board substantially perpendicular to the first printed circuit board and the optical axis, wherein the first antenna is disposed on an end part of the first circuit board arranged for being received in an opening of the second printed circuit board.

8. [Lighting] *The lighting* device according to claim 6, wherein the RF communication circuit is disposed on the first printed circuit board, such as the RF communication circuit being disposed on one side of the first printed circuit board, while the first antenna is disposed on an opposite side of the first printed circuit board.

9. [Lighting] *The lighting* device according to claim 6, wherein the first printed circuit board has an opening, and is positioned in relation to the light source such that light can pass from the light source out of the enclosure through the opening in the first printed circuit board, such as the first printed circuit board being substantially ring-shaped.

10. [Lighting] *The lighting* device according to claim 1, further comprising a second antenna, wherein the first and second antennas are oriented so as to radiate RF signals in different directions, the first and second antennas being different types of antennas.

11. [Lighting] *The lighting* device according to claim 1, comprising a control circuit arranged to control a function of the lighting device in accordance with data received in an RF signal received via the [RF] *first* antenna and the RF communication circuit.

*12. The lighting device of claim 1, wherein all metallic components having an extension larger than 1/10 of a wavelength of the RF control signals are arranged below the virtual plane.*

*13. The lighting device of claim 1, wherein the heat sink is a polymeric material with a conductive filling material.*

*14. The lighting device of claim 13, wherein the conductive filling material is metal.*

*15. The lighting device of claim 1, wherein the one or more light-emitting diodes include a set of red, green, and blue colored light-emitting diodes.*

*16. The lighting device of claim 1, further comprising a collimator.*

*17. The lighting device of claim 16, wherein the collimator is made of metal and has a transparent front cap.*

*18. The lighting device of claim 1, further comprising a first PCB and a second PCB, wherein:*

*the second PCB is arranged substantially perpendicular to the optical axis, the second PCB having an opening; and*

*the first antenna is disposed on an end part of the first PCB and the end part is positioned in the opening of the second PCB.*

*19. The lighting device of claim 18, wherein the RF communication circuit is disposed on the first PCB.*

*20. The lighting device of claim 19, further comprising a matching circuit connected between the first antenna and the RF communication circuit.*

*21. The lighting device of claim 18, wherein all metallic components having an extension larger than 1/10 of a wavelength of the RF control signals are arranged below the virtual plane.*

*22. The lighting device of claim 1, further comprising a driver circuit positioned inside the outer enclosure, the driver circuit including a mains voltage power converter, a driver for the one or more light-emitting diodes, and an additional supply for a control chip.*

*23. The lighting device of claim 22, wherein the heat sink is a polymeric material with a conductive filling material.*

*24. The lighting device of claim 1, further comprising the first antenna having a microprocessor and a matching circuit serving to match for minimal noise figure and maximum power transfer, wherein the first antenna is disposed on a PCB.*

*25. The lighting device of claim 1, wherein the one or more metallic components includes the heat sink.*

* * * * *